United States Patent [19]

Heuer et al.

[11] Patent Number: 5,942,150
[45] Date of Patent: Aug. 24, 1999

[54] USE AS ANTIFREEZE OF POLYMERS WITH RECURRING SUCCINYL UNITS

[75] Inventors: Lutz Heuer, Dormagen; Winfried Joentgen, Köln; Torsten Groth, Odenthal; Ralf-Johann Moritz, Neuss, all of Germany

[73] Assignee: Bayer Aktiengesellschaft, Leverkusen, Germany

[21] Appl. No.: 09/011,428

[22] PCT Filed: Aug. 5, 1996

[86] PCT No.: PCT/EP96/03437

§ 371 Date: Feb. 10, 1998

§ 102(e) Date: Feb. 10, 1998

[87] PCT Pub. No.: WO97/07178

PCT Pub. Date: Feb. 27, 1997

[30] Foreign Application Priority Data

Aug. 17, 1995 [DE] Germany ............ 195 30 203

[51] Int. Cl.⁶ ................ C09K 3/18; C09K 5/00
[52] U.S. Cl. ................ 252/70; 106/13; 252/71; 252/73; 252/77; 252/79
[58] Field of Search .............. 252/70, 71, 73, 252/77, 79; 106/13

[56] References Cited

U.S. PATENT DOCUMENTS

| | | | |
|---|---|---|---|
| 4,839,461 | 6/1989 | Boehmke | 528/363 |
| 4,971,724 | 11/1990 | Kalota et al. | 252/390 |
| 5,288,783 | 2/1994 | Wood | 525/418 |
| 5,296,578 | 3/1994 | Koskan et al. | 528/363 |
| 5,393,868 | 2/1995 | Freeman et al. | 528/480 |
| 5,548,036 | 8/1996 | Kroner et al. | 525/417 |
| 5,639,832 | 6/1997 | Kroner et al. | 525/419 |

FOREIGN PATENT DOCUMENTS

| | | |
|---|---|---|
| 0 256 366 A1 | 2/1988 | European Pat. Off. . |
| 0 593 187 | 4/1994 | European Pat. Off. . |
| 0 650 995 | 5/1995 | European Pat. Off. . |
| 40 34 217 | 5/1991 | Germany . |
| 43 10 995 A1 | 10/1994 | Germany . |
| 43 11 237 A1 | 10/1994 | Germany . |
| 1 404 814 | 9/1975 | United Kingdom . |
| WO 94/01486 | 1/1994 | WIPO . |

OTHER PUBLICATIONS

J. Org. Chem. 26, (1961)—pp. 1084–1091, Kovacs et al, "Chemical Studies of Polyaspartic acids". No month.

Römp, Thieme, 1993, pp. 1502–1503 No month.

*Primary Examiner*—Anthony J. Green
*Attorney, Agent, or Firm*—Sprung Kramer Schaffer & Briscoe

[57] ABSTRACT

Polymers having repeating succinyl units, especially polyaspartic acids, are suitable for antifreezing compositions.

16 Claims, No Drawings

USE AS ANTIFREEZE OF POLYMERS WITH RECURRING SUCCINYL UNITS

The invention relates to the use of polymers having repeating succinyl units as antifreezing agents and to corresponding antifreezing compositions.

Antifreezing compositions have long been known and act by their lowering of freezing point which is observed in water. Glycol is widely used. However, it is required of substances which are present in metal-clad radiators or other industrial installations which are to be protected against the freezing of water that they have anticorrosive properties and, since they are often released into the environment, that they are biodegradable (Römpp, Thieme, 1993, p. 1502).

The preparation and use of polyaspartic acid (PAA) and its derivatives has long been the subject of numerous publications and patents.

The preparation can be carried out by thermal polycondensation of aspartic acid in accordance with J. Org. Chem. 26, 1084 (1961). An intermediate which appears initially is polysuccinimide (PSI), which is referred to therein as "anhydropolyaspartic acid". PSI can be converted into PAA by hydrolysis.

U.S. Pat. No. 4 839 461 (=EP-A 0 256 366) describes the preparation of polyaspartic acid from maleic anhydride, water and ammonia.

DE-A 2 253 190 describes a process for preparing polyamino acid derivatives, especially polyaspartic acid derivatives. According to that document not only aspartic acid but also maleic acid derivatives (monoammonium salt and monoamide) are thermally polymerized to the intermediate PSI, which can subsequently be reacted, in appropriate solvents, with amines to form the desired polyamino acid derivatives.

U.S. Pat. No. 5,296,578 describes the preparation of PSI from maleic anhydride, water and ammonia. In this case the mass is reacted in a number of hours by way of highly viscous phase states to form the solid PSI, and is subsequently hydrolyzed to PAA.

U.S. Pat. No. 5,288,783 describes the preparation of PAA from maleic acid or fumaric acid, water and ammonia. Maleic anhydride is mixed with water in a stirred vessel and is converted to maleic acid with cooling. By adding concentrated ammonia solution, the maleic acid monoammonium salt is prepared. The water present is subsequently evaporated and the dry monoammonium salt is polymerized at temperatures from 190 to 350° C. Alternatively, it is proposed to process further the monoammonium salt, which is present in aqueous solution, by extrusion at temperatures from 160 to 200° C. to form PSI. The PSI prepared by one of the two procedures is then hydrolyzed under alkaline conditions to form PAA.

EP-A 593 187 describes the preparation of PSI by thermal polymerization of maleamic acid at temperatures from 160 to 330° C. in a reaction period of from 2 minutes to 6 hours. Reference is also made to polycondensation in the solvent using condensation auxiliaries.

DE-A 4 221 875 describes the preparation of modified polyaspartic acids by polycondensation and their use as additives for detergents, cleaning products, water treatment compositions and antideposition agents in the evaporative concentration of sugars.

DE-A 4 300 020 relates to a process for preparing polymers of aspartic acid by reacting maleic anhydride and ammonia or amines and to the use of the polymers as scale inhibitors, as dispersants and as an additive to detergents and cleaning products.

DE-A 4 307 114 relates to a process for preparing reaction products of polyaspartimides and amino acids and for using the reaction products as an additive to detergents and cleaning products, as a scale inhibitor and as a dispersant.

DE-A 4 310 995 relates to the use of polyaspartic acids in cleaning formulations, DE-A 4 311 237 to their use in chain lubricants.

The object of the present invention is to provide improved antifreezing compositions.

The present invention relates to the use of polymers having repeating succinyl units, especially of polyaspartic acids, as antifreezing agent.

The polymers used in accordance with the invention have repeating succinyl units with one of the following structures:

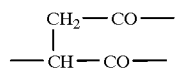

preferably

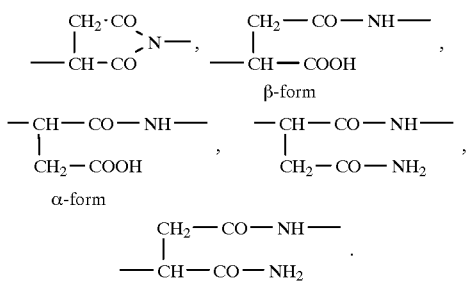

In addition, as a result of an appropriate reaction regime and choice of the precursors, it is possible for further repeating units to be present, for example a) malic acid units of the formula

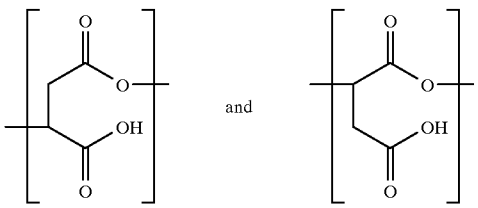

b) maleic acid and fumaric acid units of the formula

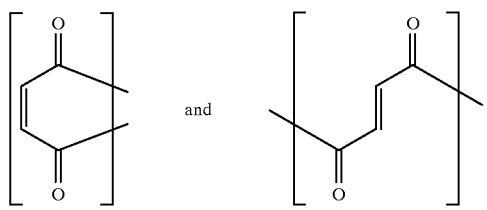

Analysis of the chemical structure takes place preferably by $^{13}$C-NMR, FT-IR and, after total hydrolysis, by HPLC, GC and GC/MS.

In many preparation processes it is not the pure acids but initially the corresponding anhydrides, for example polysuccinimide, which are obtained. Polymerization products of this kind can be converted to a PAA-containing salt by reaction with a base in the presence or absence of water. This transformation of PSI-containing to PAA-containing polymers takes place subsequently in an appropriate apparatus by hydrolysis. In this case a pH of between 5 and 14 is preferably suitable. In a particularly preferred form a pH of 7 to 12 is chosen, in particular by the addition of a base. Suitable bases are alkali metal and alkaline earth metal hydroxides or carbonates, such as, for example, sodium hydroxide, potassium hydroxide, sodium carbonate or potassium carbonate, ammonia and amines such as triethylamine, triethanolamine, diethylamine, diethanolamine, alkylamines, etc. In addition to free acids, particular preference is given to the Na, K or Ca salts thereof.

The temperature during the hydrolysis is suitably in a range of up to and including the boiling point of the PSI suspension, and is preferably from 20 to 150° C. Hydrolysis is carried out optionally under pressure.

However, it is also possible to obtain the free polyaspartic acid by purely aqueous hydrolysis or treatment of the salt with acids or acidic ion exchangers. The term "polyaspartic acid" (=PAA), in the case of the present invention, likewise comprises the salts, unless expressly stated otherwise. The finished product is obtained by drying, preferably spray drying.

Preferred polymers have a molecular weight in accordance with gel permeation chromatographical analyses (of Mw=500 to 10,000, preferably 700 to 5000, with particular preference 1000 to 4500). In general the proportion of the beta form is more than 50%, preferably more than 70%.

In a preferred form, the polymers to be used in accordance with the invention are modified polyaspartic acids which are brought to reaction by the above-described process according to the invention by reaction of a) 0.1–99.9 mol-% of PAA or PSI or 0.1–99.9 mol-% of aspartic acid with b) 99.9–0.1 mol-% of fatty acids, fatty acid amides, polybasic carboxylic acids, their anhydrides and amides, polybasic hydroxycarboxylic acids, their anhydrides and amides, polyhydroxycarboxylic acids, amino carboxylic acids, sugar carboxylic acids, alcohols, polyols, amines, polyamines, alkoxylated alcohols and amines, amino alcohols, amino sugars, carbohydrates, ethylenically unsaturated mono- and polycarboxylic acids and their anhydrides and amides, protein hydrolysates for example maize protein hydrolysate, soya protein hydrolysate, aminosulphonic acids and aminophosphonic acids.

The precursors described under a) are employed in the polymerization according to the invention to the extent of from 0.1 to 99.9 mol-%, preferably from 60 to 99.9 mol-% and, with particular preference, from 75 to 99.9 mol-%.

All fatty acids are suitable as component b) of the polymers. They may be saturated or ethylenically unsaturated. Examples are formic acid, acetic acid, propionic acid, butyric acid, lauric acid, palmitic acid, stearic acid, oleic acid, linoleic acid, linolenic acid, sorbic acid, myristic acid, undecanoic acid and all naturally occurring fatty acid mixtures, for example $C_{12}/C_{14}$ or $C_{16}/C_{18}$ fatty acid mixtures. As unsaturated fatty acids, acrylic acid and methacrylic acid can also be employed.

Furthermore, these acids can also be used in the form of their amides. Polybasic carboxylic acids which can be employed are, for example, oxalic acid, succinic acid, glutaric acid, adipic acid, malonic acid, suberic acid, aconitic acid, itaconic acid, sulphosuccinic acid, alkenylsuccinic acids ($C_1$–$C_{26}$), 1,2,3,-propanetricarboxylic acid, butanetetracarboxylic acid, furandicarboxylic acid, pyridinedicarboxylic acid. The anhydrides of polybasic carboxylic acids for example succinic anhydride, itaconic anhydride, aconitic anhydride and phthalic anhydride, can likewise be used. Also suitable as component (b), furthermore, are polybasic hydroxycarboxylic acids and polyhydroxycarboxylic acids. Polybasic hydroxycarboxylic acids carry in addition to at least one hydroxy group at least two or more carboxyl groups. Examples mentioned here are malic acid, tartaric acid, uvic acid, citric acid and isocitric acid.

Monobasic polyhydroxycarboxylic acids carry in addition to one carboxylic acid group two or more hydroxy groups, examples being glyceric acid, dimethylolpropionic acid, dimethylolbutyric acid, gluconic acid. Also suitable are monohydric alcohols having for example 1 to 22 C atoms such as, for example, ethanol, ethanol, n-propanol, i-propanol, butanol, pentanol, hexanol, octanol, lauryl acohol, stearyl alcohol, etc. The alcohols may also, if desired, have a double bond, such as allyl alcohol or oleyl alcohol. In addition, these alcohols can be alkoxylated, for example with ethylene oxide or propylene oxide. Of particular industrial interest are the adducts of from 3 to 50 mol of ethylene oxide with fatty alcohols or oxo alcohols. In addition it is possible to employ as component (b) polyols in either saturated or unsaturated form, such as, for example, ethylene glycol, propylene glycol, butanediol, butenediol, glycerol, trimethylolpropane, pentaerythritol, sorbitol, neopentyl glycol and also alkoxylated polyols such as polyethylene glycols, polypropylene glycols, ethoxylated trimethylolpropane, glycerol or pentaerythritol having molecular weights of up to 6000. Additionally suitable as comonomer (b) are amines as well, such as $C_1$–$C_{22}$-alkylamines, for example methylamine, ethylamine, propylamine, butylamine, cyclohexylamine, octylamine, isooctylamine (ethylhexylamine), stearylamine, allylamine, oleylamine, ethylenediamine, diethylenetriamine, hexamethylenediamine, piperazine, diaminobutane, dimethylamine, diethylamine, hydroxylamine, hydrazine, ethanolamine, diethanolamine, aminopropanediol, and also polyalkylenamines such as polyethylenamine having molecular weights of up to 6000. The amines can also be alkoxylated, examples being the adducts of from 3 to 30 mol of ethylene oxide with fatty amines such as oleylamine, palmitylamine, or stearylamine. Also suitable, furthermore, are amino sugars such as amino sorbitol or chitosamine. Also as component (b) are carbohydrates such as glucose, sucrose, maltose, dextrins, starch or sugar carboxylic acids, examples being mucic acid, gluconic acid, glucuronic acid, glucaric acid. Amino acids, both proteinogenic ones, such as glycine, alanine, glutamic acid and lysine or non-proteinogenic ones such as 4-aminobutyric acid, taurine, diaminosuccinic acid, 11-aminoundecanoic acid and 6-aminocaproic acid, can also be employed as component (b). For the polymerization the compounds of component (b) are employed in amounts from 0.1 to 99.9 mol-%, preferably from 0.1 to 40 mol-% and, with particular preference, from 0.1 to 25 mol-%. It is possible to employ a single compound of component (b) or mixtures of two or more compounds of (b).

If monofunctional compounds such as alcohols, amines, fatty acids or fatty acid amides are used as component (b) then they are incorporated at the chain end. They act as chain terminators and reduce the molecular weight. Polyfunctional compounds of component (b) can be incorporated in the finished polymer either at the chain end or in random distribution over the polymer chain.

The crude polymers can be freed from monomeric fractions by customary methods of working up, for example by extraction with water and 1 N hydrochloric acid or by membrane filtration. Analysis of the copolymers takes place by $^{13}$C- and $^{15}$N-NMR spectroscopy, FT-IR spectroscopy and, after total hydrolysis, by HPLC, GC and GC-MS. In the case of the polymerization according to the invention the polymer is obtained primarily in the form of the usually water-insoluble modified polysuccinimides.

The modified polyaspartic acids are prepared from the polysuccinimides preferably by aqueous hydrolysis at 20° C.–150° C. and pH 7–12, optionally under pressure. This reaction can, however, also be carried out at temperatures outside the stated temperature range and at different pH values. Suitable bases are alkali and alkaline earth metal hydroxides or carbonates such as, for example, sodium hydroxide, potassium hydroxide, sodium carbonate or potassium carbonate, ammonia and amines such as triethylamine, triethanolamine, diethylamine, diethanolamine, alkylamine, etc. Fully or partly neutralized copolymers are obtained which contain from 0.1 to 99.9 mol-% of succinyl units and from 99.9 to 0.1 mol-% of at least one compound (b) in copolymerized form.

The polymers to be used in accordance with the invention, especially polyaspartic acids, can be employed as antifreezing compositions with other known auxiliaries, for example with ethylene glycol, propylene glycol, phosphates such as sodium or potassium phosphates ($Na_xH_xPO4$, x=0–3), polyphosphates such as sodium triphosphate, borax, sorbitol, sodium lactate, glycerol, 2-propanol, ethanol, methanol, molybdates, chromates, silicates, zinc salts, sodium metasilicates, benzoates, phosphonates such as aminomethylenephosphonate, aromatic azoles, such as mercaptobenzothiazole, benzotriazole, 4-methylbenzotriazole, 5-methylbenzotriazole or mixtures of 4-/5-methylbenzotriazole, 4-/5-alkylbenzotriazole such as 4-butylbenzotriazole, benzimidazole derivatives, polyacrylates, polymethacrylates, polymaleates, copolymers based on acrylic, methacrylic or maleic acid, ligninsulphonates, taurines, acids such as citric acid, tartaric acid, gluconic acid, EDTA, phenylaminoacetate salts of potassium or sodium, triethanolamine, glycocoll, alanine, isatic acid and nitrites.

Preferred antifreezing compositions comprise:

from 1 to 95 parts by weight of the polymers to be used in accordance with the invention, especially polyaspartic acid from 0 to 90 parts by weight of ethylene glycol, propylene glycol or a mixture of both from 0 to 40 parts by weight of water.

The invention additionally relates to antifreezing compositions comprising polymers having repeating succinyl units, especially polyaspartic acids. The antifreezing compositions according to the invention are particularly suitable for use in cooling waters, for example for car engines.

They are additionally suitable for use in deicing liquids, for example for deicing aircraft or take-off and landing strips. They can be employed, moreover, in antifreezing compositions in screen wash units of vehicles. The polymers according to the invention can likewise serve, alone or in combination with granulated minerals such as grit, as biodegradable and non-corrosive substitutes for gritting salts.

EXAMPLES

Example 1

Preparing polysuccinimide from maleamic acid 16 kg of maleamic acid (139.1 mol), melting point 166° C., were conveyed continuously at a metering rate of 7 kg/h by means of a conveyor screw into the mixing section of the screw, which was heated at 172–174° C. In the mixing zone, a thin melt film is immediately formed on the hot surface of the screw shafts, and this film polymerizes and in doing so releases water of reaction. In the wide extent of the screw the polymer was completely dried and left the screw as a coarsely particulate to powdery mass. 12,660 g of product are obtained which is characterized by the following analyses (Table 1).

Example 2

Preparing polysuccinimide from maleic acid monoammonium salt

The experiment described in Example 1 was repeated using maleic acid monoammonium salt as precursor. 5 kg of maleic acid ammonium salt (37.6 mol) (melting point 171° C.) were supplied at a metering rate of 5 kg/h to the screw which was heated at 174–176° C. The product obtained was 3542 g of a coarsely particulate to powdery mass (for analysis see Table 1).

Example 3

Preparing polysuccinimide from an aqueous maleic acid monoammonium salt solution 6800 g of 25% strength ammonia solution (100 mol) are added at 60° C. over one hour to a mixture of 9800 g (100 mol) of maleic anhydride and 2825 g of water. A suspension of the monoammonium salt of maleic acid in water is obtained. At temperatures above 70° C. this suspension undergoes a transition to a homogeneous solution which has a solids content of about 69.5%. This solution, which has a temperature of about 75° C., is metered at a rate of 3 kg/h into the mixing section of the screw, which is heated at 152–154° C. In the mixing section there is immediate evaporation of the solution water and brief formation of the dry ammonium salt which, however, is partially dissolved again in the saturated water vapour atmosphere within the screw. This process leads to the formation of a mixed phase comprising highly concentrated solution and melt. This effect allows the formation of the characteristic melt film at a temperature of just 148–152° C. (measured in the melt), which is well below the melting temperature (171° C.) of the pure salt. In the subsequent course of the screw the water of solution and of reaction is then removed completely and, in turn, 9130 g of a coarsely particulate to powdery product are obtained (for analysis see Table 1).

TABLE 1

| Examples | 1 | 2 | 3 |
|---|---|---|---|
| Elemental composition: | | | |
| C [% by weight] | 46.6 | 46.6 | 45.0 |
| H [% by weight] | 4.0 | 3.7 | 4.0 |
| N [% by weight] | 14.1 | 13.3 | 13.5 |
| $NH_4$ [% by weight] | 1.5 | 0.7 | 1.1 |
| $H_2O$ [% by weight] | 0.3 | 0.3 | 0.4 |
| Molar mass distribution by GPC[1]: | | | |

TABLE 1-continued

| Examples | 1 | 2 | 3 |
|---|---|---|---|
| Mw | 2608 | 3050 | 3350 |
| Saponification number (mg of NaOH/g) | 397 | 401 | 426 |

1) after conversion to the sodium salt

The action against ice formation (antifreezing agent) was determined by conventional measurement of the reduction in freezing point.

Use Example 1

Freezing point reduction in aqueous systems:

The following aqueous systems were prepared using the polyaspartic acids indicated in the Preparation Examples:

System 1: Polyaspartic acid from Example 1 in the concentrations stated below:
0, 5, 10, 15, 20, 25, 30, 35 and 40% by weight, in each case made up to 100% with distilled water.

System 2: Polyaspartic acid from Example 2 in the concentrations stated below:
0, 5, 10, 15, 20, 25, 30, 35 and 40% by weight, in each case made up to 100% with distilled water.

Comparative Example

Using ethylene glycol in the following concentrations:
0, 5, 10, 15, 20, 25, 30, 35 and 40% by weight, in each case made up to 100% with distilled water.

The protection against ice formation with these systems was determined by measuring the reduction in freezing point. The criterion adopted in this case was the reduction in freezing point relative to water. The following values were obtained:

TABLE

| Amount used | Temperature (°C.) | | |
|---|---|---|---|
| (% by weight) | System 1 | System 2 | Comparative |
| 0 | 0 | 0 | 0 |
| 5 | −0.8 | −0.8 | −0.7 |
| 10 | −1.8 | −1.8 | −4 |
| 15 | −5.4 | −5.8 | −7 |
| 20 | −8.8 | −9.8 | −9 |
| 25 | −12 | −13.9 | −13.5 |
| 30 | −15.9 | −17.4 | −16 |
| 35 | −19.4 | −22 | −20.5 |
| 40 | −23 | −26 | −24 |

It is evident that the systems according to the invention exhibit an equivalent reduction in freezing point relative to the comparative system but possess, in addition, the advantage that they have a corrosion-inhibiting action.

We claim:

1. A method of reducing the freezing point of a water-containing mixture which comprises adding thereto an antifreezing amount of a polymer having repeating units of at least one of the following structures $$\begin{array}{cc} \mathrm{CH_2 \cdot CO} \\ | \quad\quad\ \ \ \diagdown \mathrm{N}- \\ -\mathrm{CH-CO} \end{array} \quad\quad \begin{array}{c} \mathrm{CH_2-CO-NH-} \\ | \\ -\mathrm{CH-COOH} \\ \beta\text{-form} \end{array}$$

-continued $$\begin{array}{c} -\mathrm{CH-CO-NH-} \\ | \\ \mathrm{CH_2-COOH} \end{array} \quad\quad \begin{array}{c} -\mathrm{CH-CO-NH-} \\ | \\ \mathrm{CH_2-CO-NH_2} \end{array}$$
α-form $$\begin{array}{c} \mathrm{CH_2-CO-NH-} \\ | \\ -\mathrm{CH-CO-NH_2} \end{array}$$

2. A method according to claim 1, wherein the polymer is a polyaspartic acid or a polysuccinimide.

3. A method according to claim 1, wherein the polymer is added in an amount sufficient to result in a concentration of from 1–95% by weight of said polymer in said mixture.

4. A method according to claim 1, wherein said water-containing mixture is a coolant for an engine.

5. A method according to claim 1, wherein the polymer has a molecular weight by gel permeation chromatographical analysis of from 500 to 10,000.

6. A method according to claim 5, wherein the molecular weight ranges from 700 to 5000.

7. A method according to claim 5, wherein the molecular weight ranges from 1000 to 4500.

8. A method according to claim 1, wherein the polymers are a product of the reaction of a) 0.1–99.9 mol-% of polyaspartic acid, polysuccinimide or aspartic acid with b) 99.9–0.1 mol-% of one or more members selected from the group consisting of fatty acids, fatty acid amides, polybasic carboxylic acids, polybasic carboxylic acid anhydrides, polybasic carboxylic acid amides, polybasic hydroxycarboxylic acids, polybasic hydroxycarboxylic acid anhydrides, polybasic hydroxycarboxylic acid amides, polyhydroxycarboxylic acids, amino carboxylic acids, sugar carboxylic acids, alcohols, polyols, amines, polyamines, alkoxylated alcohols and amines, amino alcohols, amino sugars, carbohydrates, ethylenically unsaturated mono- and polycarboxylic acids, polycarboxylic acid anhydrides, polycarboxylic acid amides, protein hydrolysates, maize protein hydrolysate, or soya protein hydrolysate, aminosulphonic acids and aminophosphonic acids.

9. A method according to claim 1, wherein the protein hydrolysate is at least one of maize protein hydrolysate, or soya protein hydrolysate.

10. A method according to claim 1, wherein said water-containing mixture further comprises ethylene glycol.

11. A method according to claim 1, wherein the polymer further contains at least one of the following repeating units:

$$\left[\begin{array}{c} \mathrm{O} \\ \| \\ \diagup\diagdown \\ \ \ \ \ \ \ \ \mathrm{O-} \\ \diagdown\diagup \\ \ \ \ \ \mathrm{OH} \\ \| \\ \mathrm{O} \end{array}\right] \quad\text{and}\quad \left[\begin{array}{c} \mathrm{O} \\ \| \\ \diagup\diagdown \\ \ \ \ \ \ \ \ \mathrm{O-} \\ \diagdown\diagup \\ \ \ \ \ \mathrm{OH} \\ \| \\ \mathrm{O} \end{array}\right]$$

-continued

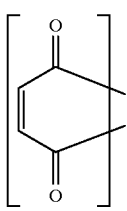 and 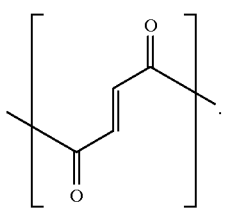.

12. Antifreezing compositions comprising from 5 to 95% by weight of polymers having repeating units of at least one of the following structures

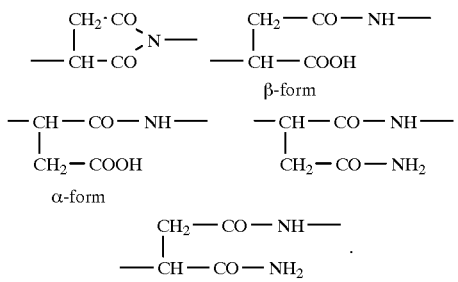

13. Antifreezing compositions according to claim 12, wherein the polymer is a polyaspartic acid.

14. A method for deicing surfaces which comprises applying thereto an effective deicing amount of a polymer having repeating units of at least one of the following structures

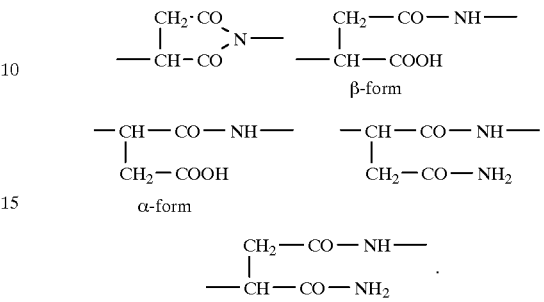

15. A method according to claim 14, wherein the surface being deiced is an aircraft or airport runway.

16. A method according to claim 14, wherein said surface is an airport runway and the polymer is combined with a grit.

* * * * *